US012782269B2

(12) United States Patent
Ohno et al.

(10) Patent No.: US 12,782,269 B2
(45) Date of Patent: Nov. 3, 2026

(54) OPTICAL INSPECTION APPARATUS, OPTICAL INSPECTION SYSTEM, OPTICAL INSPECTION METHOD, AND NON-TRANSITORY STORAGE MEDIUM

(71) Applicant: KABUSHIKI KAISHA TOSHIBA, Tokyo (JP)

(72) Inventors: Hiroshi Ohno, Tokyo (JP); Hiroya Kano, Kawasaki Kanagawa (JP); Hideaki Okano, Yokohama Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 175 days.

(21) Appl. No.: 18/174,708

(22) Filed: Feb. 27, 2023

(65) Prior Publication Data

US 2024/0094114 A1 Mar. 21, 2024

(30) Foreign Application Priority Data

Sep. 20, 2022 (JP) ................................ 2022-148783

(51) Int. Cl.
*G01N 21/25* (2006.01)
*G01N 21/17* (2006.01)
(Continued)

(52) U.S. Cl.
CPC ........... *G01N 21/255* (2013.01); *G01N 21/29* (2013.01); *G01N 2021/1765* (2013.01);
(Continued)

(58) Field of Classification Search
CPC ................ G01N 21/255; G01N 21/29; G01N 2021/1765; G01N 2021/3133;
(Continued)

(56) References Cited

U.S. PATENT DOCUMENTS 5,675,407 A 10/1997 Geng
10,732,102 B2 8/2020 Ohno et al.
(Continued)

FOREIGN PATENT DOCUMENTS

CN 114113100 A 3/2022
CN 114324365 A 4/2022
(Continued)

OTHER PUBLICATIONS

Walton L. Howes, "Rainbow schlieren and its applications," Applied Optics, vol. 23, No. 14, pp. 2449-2460 (1984).
(Continued)

*Primary Examiner* — Tarifur R Chowdhury
*Assistant Examiner* — Akbar H. Rizvi
(74) *Attorney, Agent, or Firm* — Finnegan, Henderson, Farabow, Garrett & Dunner, LLP

(57) ABSTRACT

According to an embodiment, an optical inspection apparatus includes: an illumination portion, a wavelength selection portion and an imaging portion. The illumination portion irradiates a first object point of a surface of an object with first illumination light, and a second object point of the surface of the object with second illumination light. The imaging portion images light from the first object point through the wavelength selection portion when a normal direction at the first object point and a direction of the first illumination light have an opposing relationship, and images light from the second object point through the wavelength selection portion when a normal direction at the second object point and a direction of the second illumination light have an opposing relationship.

17 Claims, 12 Drawing Sheets

(51) Int. Cl.
*G01N 21/29* (2006.01)
*G01N 21/31* (2006.01)
*G01N 21/84* (2006.01)

(52) U.S. Cl.
CPC ................ *G01N 2021/3133* (2013.01); *G01N 2021/845* (2013.01); *G01N 2201/061* (2013.01); *G01N 2201/068* (2013.01)

(58) Field of Classification Search
CPC ....... G01N 2021/845; G01N 2201/061; G01N 2201/068; G01N 21/8901; G01N 2021/8924; G01N 21/8806; G01N 2021/8845; G01B 11/303
See application file for complete search history.

(56) References Cited

U.S. PATENT DOCUMENTS

| | | | | |
|---|---|---|---|---|
| 2007/0153285 | A1 | 7/2007 | Elton et al. | |
| 2014/0219542 | A1* | 8/2014 | Lee | G06T 7/0004 382/147 |
| 2014/0319351 | A1* | 10/2014 | Yamada | G01N 21/8901 250/339.02 |
| 2015/0021399 | A1* | 1/2015 | Gurevich | G06K 7/10732 235/462.21 |
| 2016/0202048 | A1 | 7/2016 | Meng et al. | |
| 2016/0371568 | A1* | 12/2016 | Tin | G06F 18/24155 |
| 2020/0333262 | A1* | 10/2020 | Zhao | G01N 21/8806 |
| 2021/0131961 | A1* | 5/2021 | Ohno | G01N 21/474 |
| 2022/0065797 | A1 | 3/2022 | Terasawa et al. | |
| 2022/0086326 | A1* | 3/2022 | Ohno | H04N 9/01 |
| 2022/0146435 | A1 | 5/2022 | Ohno | |
| 2023/0304929 | A1 | 9/2023 | Ohno et al. | |
| 2023/0324309 | A1 | 10/2023 | Ohno | |

FOREIGN PATENT DOCUMENTS

| | | | |
|---|---|---|---|
| CN | 114441529 | A | 5/2022 |
| JP | 2000-081319 | A | 3/2000 |
| JP | 2000-81319 | A | 3/2000 |
| JP | 2008-191040 | A | 8/2008 |
| JP | 2016-128816 | A | 7/2016 |
| JP | 2018-128436 | A | 8/2018 |
| JP | 6818702 | B2 | 1/2021 |
| JP | 2022-049881 | A | 3/2022 |
| JP | 2022-49881 | A | 3/2022 |
| JP | 7696852 | B2 | 6/2025 |
| JP | 7714493 | B2 | 7/2025 |

OTHER PUBLICATIONS

Hiroshi Ohno et al., "One-shot BRDF imaging system to obtain surface properties," Optical Review, vol. 28, pp. 655-661, https://doi.org/10.1007/s10043-021-00689-x (2021).
Japan Patent Office, Office Action in JP App. No. 2022-148783 (Dec. 2, 2025).
The State Intellectual Property Office of People's Republic of China, Office Action in CN App No. 202310184570.X (Apr. 1, 2026).
Japan Patent Office, Decision to Grant in JP App No. 2022-148783 (Mar. 24, 2026).

* cited by examiner

OPTICAL INSPECTION APPARATUS, OPTICAL INSPECTION SYSTEM, OPTICAL INSPECTION METHOD, AND NON-TRANSITORY STORAGE MEDIUM

CROSS-REFERENCE TO RELATED APPLICATIONS

This application is based upon and claims the benefit of priority from Japanese Patent Application No. 2022-148783, filed Sep. 20, 2022, the entire contents of all of which are incorporated herein by reference.

FIELD

Embodiments described herein relate generally to an optical inspection apparatus, an optical inspection system, an optical inspection method, and a non-transitory storage medium.

BACKGROUND

In various industries, surface measurement of an object in a noncontact state is important. As a conventional method, there exists a method in which an object is illuminated with spectrally divided light beams, an imaging element acquires each spectrally divided image, and the direction of each light beam is estimated, thereby acquiring the information of the object surface.

DETAILED DESCRIPTION

Figure 1:
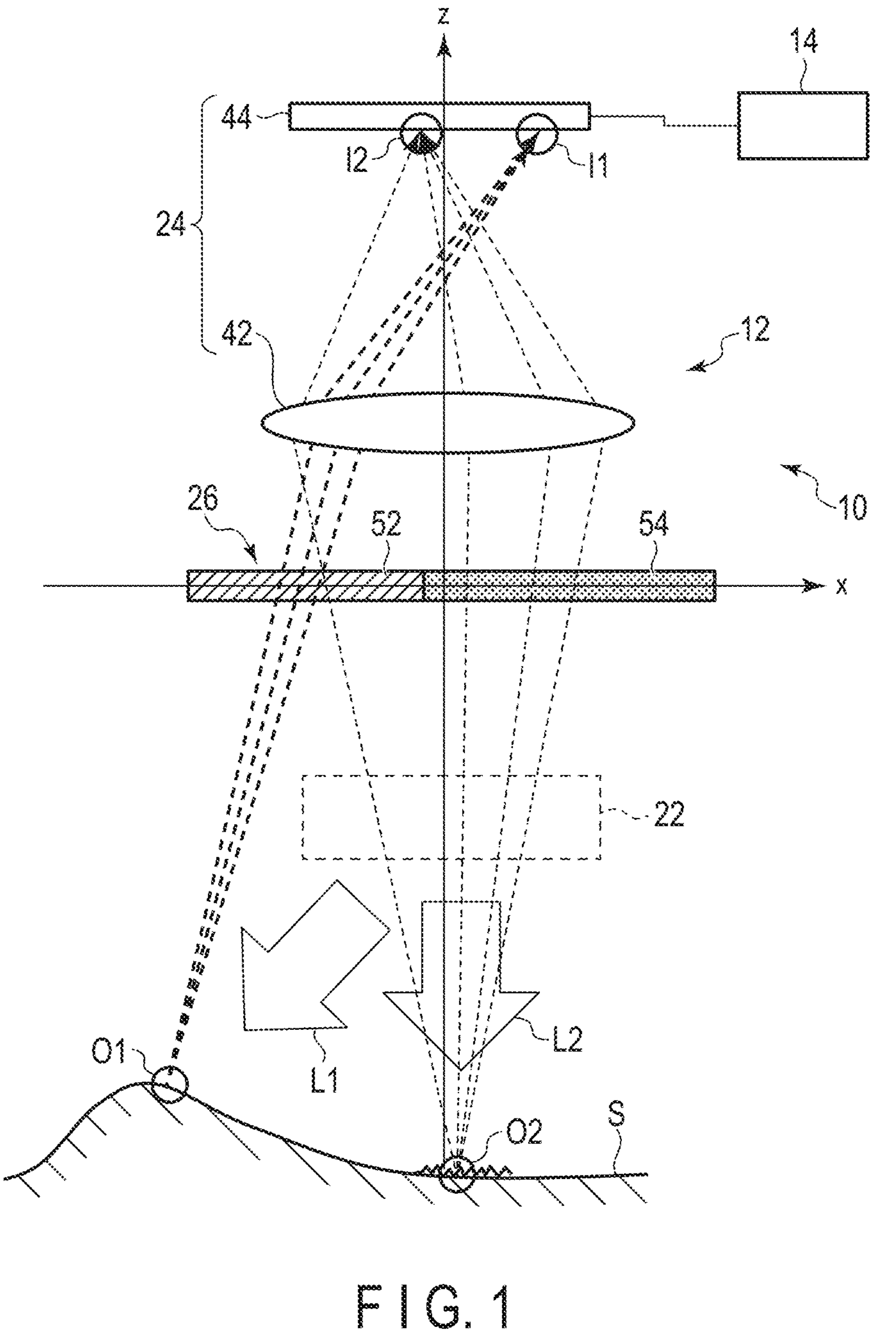
FIG. 1 is a schematic view showing an optical inspection system according to the first embodiment.

An object of an embodiment is to provide an optical inspection apparatus, an optical inspection system, an optical inspection method, and a non-transitory storage medium storing an optical inspection program, which can acquire the information of the surface of an object including a curved surface.

According to the embodiment, an optical inspection apparatus includes an illumination portion, a wavelength selection portion, and imaging portion. The illumination portion is configured to: irradiate a first object point of a surface of an object with first illumination light, and irradiate a second object point of the surface of the object, which is different from the first object point, with second illumination light having a direction different from a direction of the first illumination light. The wavelength selection portion includes at least two wavelength selection regions that selectively transmit light having different wavelength spectra. The imaging portion is configured to: image light from the first object point through the wavelength selection portion when a normal direction at the first object point and a direction of the first illumination light have an opposing relationship, and image light from the second object point through the wavelength selection portion when a normal direction at the second object point which is different from the normal direction at the first object point and a direction of the second illumination light have an opposing relationship. The wavelength selection portion is arranged between the imaging portion and the surface of the object.

Embodiments will now be described with reference to the accompanying drawings. The drawings are schematic or conceptual, and the relationship between the thickness and the width of each part, the size ratio between parts, and the like do not always match the reality. Also, even same portions may be illustrated in different sizes or ratios depending on the drawing. In the present specification and the drawings, the same elements as described in already explained drawings are denoted by the same reference numerals, and a detailed description thereof will appropriately be omitted.

First Embodiment

Figure 2:
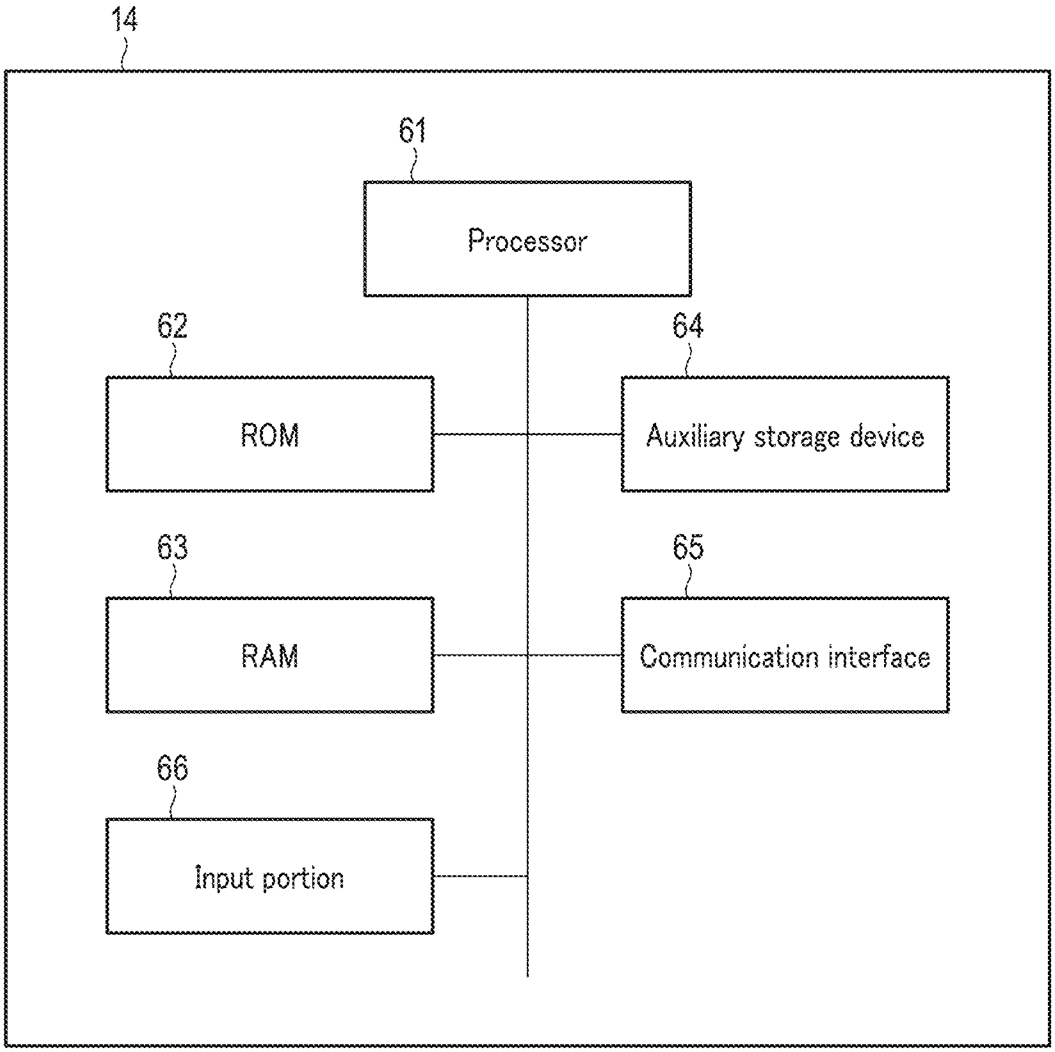
FIG. 2 is a schematic block diagram of a processing device of the optical inspection system shown in FIG. 1.
Figure 3:
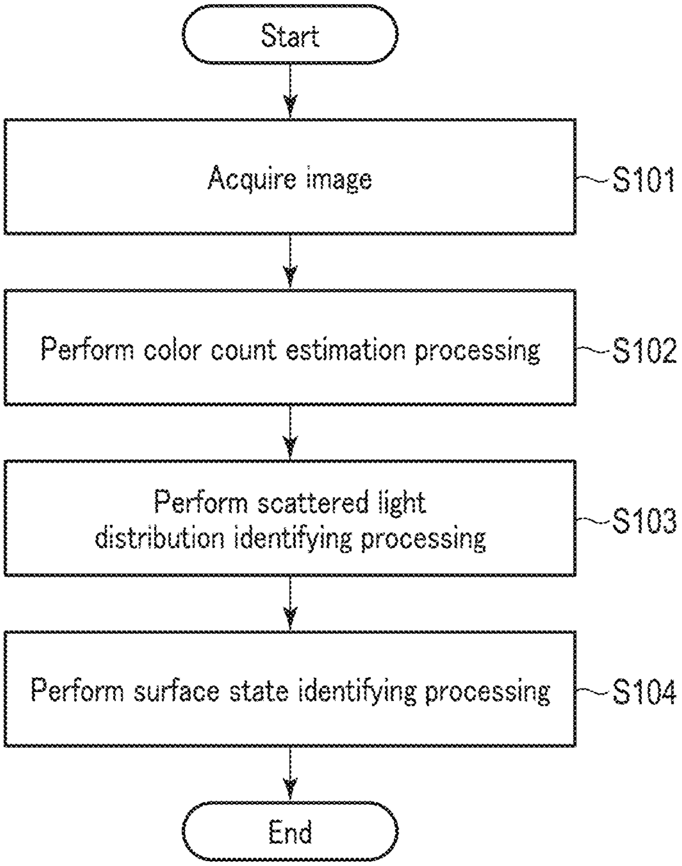
FIG. 3 is a flowchart for explaining a processing procedure of the processing device of the optical inspection system shown in FIG. 1.

An optical inspection system 10 according to this embodiment will be described below with reference to FIGS. 1 to 3.

In this specification, light is a kind of electromagnetic wave and includes X-rays, ultraviolet rays, visible light, infrared rays, and microwaves. In this embodiment, it is assumed that the light is visible light, and for example, the wavelength is in a region of 400 nm to 750 nm. An imaging portion 24 includes an imaging optical element 42 with an optical axis and a sensor (image sensor) 44.

FIG. 1 shows a schematic sectional view of an optical inspection apparatus 12 of the optical inspection system 10 according to this embodiment and a processing device 14. Assume that this sectional view is on an x-z plane.

The optical inspection apparatus 12 according to the embodiment includes an illumination portion 22, the imaging portion 24, and a wavelength selection portion 26.

The illumination portion 22 is configured to emit first illumination light L1 and second illumination light L2. Assume that the first illumination light L1 and the second illumination light L2 each are white light. Assume that the wavelength spectrum of each of the illumination light L1 and L2 has a significant intensity distribution between 400 nm and 750 nm. Assume that the first illumination light L1 and the second illumination light L2 each are substantially parallel light, and the direction of the first illumination light L1 and the second illumination light L2 are different from each other. Although any light source may be used for illumination lights L1 and L2, a white LED is used as a light source.

Referring to FIG. 1, the illumination portion 22 is provided between the surface of an object S and the wavelength selection portion 26. However, the light source of the illumination portion 22 may not be provided between the surface of the object S and the wavelength selection portion 26. In this case, the surface of the object S is irradiated with the first illumination light L1 and the second illumination light L2 through, for example, a half mirror, beam splitter, mirror, or the like.

The imaging portion 24 includes an imaging optical element 42 and the image sensor (sensor) 44.

The imaging optical element 42 is, for example, an imaging lens. In FIG. 1, the imaging lens is schematically drawn and represented by one lens but may be a lens set formed by a plurality of lenses. Alternatively, the imaging optical element 42 may be a concave mirror, a convex mirror, or a combination thereof. That is, any optical element having a function of collecting, to an image point that is conjugate to an object point, a light beam group exiting from one point of the object S, that is, the object point can be used as the imaging optical element 42. Collecting (condensing) a light beam group exiting from an object point on the surface of the object S to an image point by the imaging optical element 42 is called imaging. This is also expressed as transferring an object point to an image point (the conjugate point of the object point). In addition, the aggregate plane of conjugate points to which a light beam group exiting from a sufficiently apart object point is transferred by the imaging optical element will be referred to as the focal plane of the imaging optical element 42. A line that is perpendicular to the focal plane and passes through the center of the imaging optical element is defined as an optical axis. At this time, the conjugate image point of the object point transferred by the light beam will be referred to as a focal point. In this embodiment, the imaging optical element 42 will be simply referred to as a lens.

An xyz orthogonal coordinate system is defined in the optical inspection apparatus 12 shown in FIG. 1. FIG. 1 shows an x-z plane. Although not shown, the y-axis is orthogonal to the x-axis and the z-axis. In the cross-section shown in FIG. 1, the optical axis is the z-axis.

The wavelength selection portion 26 is arranged between the imaging portion 24 and the surface of the object S. The wavelength selection portion 26 includes at least two or more wavelength selection regions 52 and 54. Of these wavelength selection regions, the two wavelength selection regions are the first wavelength selection region 52 and the second wavelength selection region 54. Note that the direction in which the first wavelength selection region 52 and the second wavelength selection region 54 are arranged is along the x-axis. That is, the first wavelength selection region 52 and the second wavelength selection region 54 are orthogonal to the x-axis. The direction in which the wavelength selection regions 52 and 54 extend is along the y-axis. That is, the first wavelength selection region 52 and the second wavelength selection region 54 extend along the y-axis. Note, however, this not exhaustive, and the first wavelength selection region 52 or the second wavelength selection region 54 may be orthogonal to the y-axis.

The first wavelength selection region 52 passes a light beam having wavelength spectrum including the first wavelength. In this case, to pass a light beam means to make the light beam travel from an object point to an image point by transmission or reflection. On the other hand, the first wavelength selection region substantially shields against a light beam of the second wavelength. In this case, to shield against the light beam means not to pass the light beam. That is, this means not to make the light beam propagate from the object point to the image point.

The second wavelength selection region 54 passes a wavelength spectrum including a light beam of the second wavelength. On the other hand, the wavelength selection region 54 substantially shields against a light beam of the first wavelength. Accordingly, the wavelength selection regions 52 and 54 of the wavelength selection portion 26 selectively pass light having at least two different wavelength spectra.

For example, the first wavelength is blue light with a wavelength of 450 nm, and the second wavelength is red light with a wavelength of 650 nm. However, the present embodiment is not limited to this, and any wavelengths can be used.

Assume that the image sensor 44 has at least one or more pixels, and each pixel can receive light beams of at least two different wavelengths, that is, the light beam of the first wavelength and the light beam of the second wavelength. A plane including the region where the image sensor 44 is arranged is the image plane of the imaging optical element 42. The image sensor 44 can be either an area sensor or a line sensor. The area sensor is a sensor in which pixels are arrayed in an area on the same surface. The line sensor is a sensor in which pixels are linearly arrayed. Each pixel may include color channels of three channels of R, G, and B. In this embodiment, the image sensor 44 is an area sensor, and each pixel includes two color channels of red and blue. That is, assume that blue light having a wavelength of 450 nm and red light having a wavelength of 650 nm can be respectively received by independent color channels of the sensor 44. However, each color channel need not be completely independent and may have slight sensitivity to a wavelength other than a wavelength to which an arbitrary color channel has high sensitivity.

The distribution of directions of reflected light beams from the object point on the surface of the object S can be represented by a distribution function called a BRDF (Bidirectional Reflectance Distribution Function). The BRDF changes depending on the surface properties/shape of an object in general. For example, if the surface is rough, reflected light spreads in various directions. Hence, the BRDF represents a wide distribution. That is, if the BRDF represents a wide distribution, the reflected light exists in a wide angle. On the other hand, if the surface of the object S is a mirror surface, reflected light includes almost only specular reflection components, and the BRDF represents a narrow distribution. As described above, the BRDF reflects the surface properties/minute shape of the surface of the object S. Here, the surface properties/minute shape may be a surface roughness or fine unevenness with a size close to the wavelength of light or less than that (that is, less than the wavelength by a factor of several 10). In this embodiment, since the light is visible light, any information concerning the height distribution of a surface with a size less than several 10 μm will do.

The processing device 14 is connected to the optical inspection apparatus 12. The processing device 14 includes, for example, a processor 61 (control portion), a ROM (storage portion) 62, a RAM 63, an auxiliary storage device 64 (storage portion), a communication interface 65 (communication portion), and an input portion 66.

The processor 61 is the center part of a computer that performs processes such as calculation and control necessary for processing of the processing apparatus 14 and integrally controls the overall processing apparatus 14. The processor 61 executes control to implement various functions of the processing apparatus 14 based on programs such as system software, application software, or firmware stored in a non-transitory storage medium such as the ROM 62 or the auxiliary storage device 64. The processor 61 includes, for example, a CPU (Central Processing Unit), a MPU (Micro Processing Unit), a DSP (Digital Signal Processor), an ASIC (Application Specific Integrated Circuit), or an FPGA (Field Programmable Gate Array). Alternatively, the processor 61 is a combination of them. The processing apparatus 14 may include one or a plurality of processors 61.

The ROM 62 is equivalent to the main storage device of the computer whose center is the processor 61. The ROM 62 is a nonvolatile memory dedicated to read out data. The ROM 62 stores the above-mentioned programs. The ROM 62 stores data, various set values, or the like used to perform various processes by the processor 61.

The RAM 63 is equivalent to the main storage device of the computer whose center is the processor 61. The RAM 63 is a memory used to read out and write data. The RAM 63 is used as a so-called work area or the like for storing data to be temporarily used to perform various processes by the processor 61.

The auxiliary storage device 64 is equivalent to the auxiliary storage device of the computer whose center is the processor 61. The auxiliary storage device 64 is, for example, an EEPROM (Electrically Erasable Programmable Read-Only Memory)®, an HDD (Hard Disk Drive), or an SSD (Solid State Drive). The auxiliary storage device 64 sometimes stores the above-mentioned programs. The auxiliary storage device 64 saves data used to perform various processes by the processor 61, data generated by processing of the processor 61, various set values, and the like.

Programs stored in the ROM 62 or the auxiliary storage device 64 include programs for controlling the processing apparatus 14. For example, an optical inspection program is suitably stored in the ROM 62 or the auxiliary storage device 64.

The communication interface 65 is an interface for communicating with another apparatus through a wire or wirelessly via a network or the like, receiving various kinds of information transmitted from another apparatus, and transmitting various kinds of information to another apparatus. The processing apparatus 14 acquires image data obtained by the image sensor 44 via the communication interface 65.

The processing apparatus 14 preferably includes the input portion 66 such as a keyboard for inputting, for example, the arrangement of the wavelength selection portion 26 and selection of a type. The input portion 66 may input various kinds of information to the processor 61 wirelessly via the communication interface 65.

The processing apparatus 14 executes processing of implementing various functions by causing the processor 61 to execute programs or the like stored in the ROM 62 and/or the auxiliary storage device 64 or the like. Note that it is also preferable to store the control program of the processing apparatus 14 not in the ROM 62 and/or auxiliary storage device 64 of the processing apparatus 14, but in an appropriate server or cloud. In this case, the control program is executed while the server or the cloud communicates with, for example, the processor 61 of the optical inspection system 10 via the communication interface 65. That is, the processing apparatus 14 according to this embodiment may be provided in the optical inspection system 10 or in the server or cloud of systems at various inspection sites apart from the optical inspection system. It is also preferable to store the optical inspection program not in the ROM 62 or the auxiliary storage device 64 but in the server or the cloud, and execute it while the server or the cloud communicates with, for example, the processor 61 of the optical inspection system 10 via the communication interface 65. The processor 61 (processing apparatus 14) can therefore execute the optical inspection program (optical inspection algorithm) to be described later.

The processor 61 (processing device 14) controls the emission timing of the light source of the illumination portion 22, the acquisition timing of image data by the image sensor 44, the acquisition of image data from the image sensor 44, and the like.

The operation principle of the optical inspection system 10 according to this embodiment in the above configuration will be described.

Referring to FIG. 1, assume that, for example, a first object point O1 is a mirror surface, and an uneven defect in a micron size close to the wavelength of light exists at a second object point O2. At this time, the BRDF at the first object point O1 has a narrow distribution. In contrast to this, the BRDF at the second object point O2 has a wide distribution. That is, the first object point O1 and the second object point O2 have different BRDFs.

The first illumination light L1 produces reflected light from the first object point O1. The reflected light from the first object point O1 passes through only the first wavelength selection region 52 of the wavelength selection portion 26 and becomes, for example, blue light having a wavelength spectrum from a wavelength of 430 nm to a wavelength of 480 nm.

The second illumination light L2 produces reflected light from the second object point O2. The reflected light from the second object point O2 passes through both the first wavelength selection region 52 and the second wavelength selection region 54 of the wavelength selection portion 26. The light that has passed through the first wavelength selection region 52 becomes blue light having a wavelength spectrum from a wavelength of 430 nm to a wavelength of 480 nm. The light that has passed through the second wavelength selection region 54 becomes red light having a wavelength spectrum from a wavelength 620 nm to a wavelength of 680 nm. Note that of the reflected light from the second object point O2, light having the second wavelength incident on the first wavelength selection region 52 is shielded, and light having the first wavelength incident on the second wavelength selection region 54 is shielded.

If the reflected light from the first object point O1 can reach the imaging optical element 42, the first object point O1 is transferred to a first image point I1 by the imaging optical element 42. In this embodiment, the reflected light from the second object point O2 reaches the imaging optical element 42, and the second object point O2 is transferred to a second image point I2.

If the first illumination light L1 is directed in the same direction as that of the second illumination light L2, the reflected light from the first object point O1 cannot reach the imaging optical element 42. This is because the normal direction of the surface of the object S at the first object point O1 differs from that at the second object point O2, and hence a reflection direction is determined in accordance with the illumination direction and the normal direction. That is, the reflected light cannot reach the imaging optical element 42 unless the direction of the illumination light is properly set in accordance with the normal direction of the surface of the object S. If the reflected light does not reach the imaging optical element 42, the first object point O1 is not depicted in an image. That is, the optical inspection system 10 cannot inspect the surface state of the first object point O1 unless the reflected light from the first object point O1 reaches the imaging optical element 42.

The second object point O2 is transferred to the second image point I2 by the lens. In addition, if the second illumination light is directed in the same direction as that of the first illumination light L1, the reflected light from the second object point O2 cannot reach the imaging optical element 42. This is because the normal direction of the surface of the object S at the first object point O1 differs from that at the second object point O2, and hence a reflection direction is determined in accordance with the illumination direction and the normal direction. That is, the reflected light cannot reach the lens unless the direction of the illumination light is properly set in accordance with the normal direction of the surface of the object S. If the reflected light does not reach the imaging optical element 42, the second object point O2 is not depicted as an image. That is, the optical inspection system 10 cannot inspect the surface S state of the second object point O2 unless the reflected light from the second object point O2 reaches the imaging optical element 42.

As described above, when the optical inspection apparatus 12 irradiates the first illumination light L1 and the second illumination light L2 having different directions to the first object point O1 and the second object point O2 having different normal directions, the optical inspection apparatus 12 can simultaneously depict both the first object point O1 and the second object point O2 as images, thereby the processing device 14 can acquire the images (S101). In contrast to this, if the first illumination light L1 and the second illumination light L2 have the same direction, the optical inspection apparatus 12 both cannot be simultaneously depicted as images.

The first image point I1 and the second image point I2 are substantially located on the area sensor 44. The image acquired by the area sensor 44 is transmitted as an electric signal to the processing device 14. At the first image point I1, only blue light is received by the area sensor 44. Accordingly, the processing device 14 recognizes that light has passed through the single type of first wavelength selection region 52. At the second image point I2, blue light and red light are simultaneously received. Accordingly, the processing device 14 recognizes that light has passed through the two types of wavelength selection regions 52 and 54. The processing of estimating the number of colors with the processing device 14 in this manner will be referred to as color count estimation processing. With the color count estimation processing, the processing device 14 is possible to acquire the color count (the number of colors) of light received at the respective image points I1 and I2 (S102).

Color count estimation with the processing device 14 can be implemented by the relative rations between the pixel values of the respective color channels in an arbitrary pixel of the sensor 44 of the optical inspection apparatus 12. For example, if only blue light is received by an arbitrary pixel of the sensor 44 of the optical inspection apparatus 12, the pixel value of a blue channel in the pixel is large, and the pixel value of a red channel becomes also 0. At this time, the intensity of the red channel is sufficiently small relative to the blue channel. In contrast to this, if both blue right and red light are simultaneously received by an arbitrary pixel of the sensor 44 of the optical inspection apparatus 12, the pixel value of the blue channel is large, and the pixel value of the red channel is also large. At this time, the intensity of the red channel is relatively similar to that of the blue channel. If only red light is received by an arbitrary pixel of the sensor 44 of the optical inspection apparatus 12, the pixel value of the red channel is large, and the pixel value of the blue channel becomes almost 0. At this time, the intensity of the blue channel is sufficiently small relative to the red channel. As described above, a color count can be estimated from the relative ratio of the pixel values of the respective color channels in each pixel.

However, as for how to count the number of colors with the processing device 14, various methods can be considered depending on the manner to set background noise (dark current noise or the spectral performance of the image sensor or the wavelength selection region). For example, depending on the spectral performance of the image sensor 44, even if green light does not reach the image sensor 44, an electrical signal corresponding to green light may react by red light. To prevent this, the processing device 14 executes the calibration for associating the number of colors with the number of wavelength selection regions 52 and 54 through which light beams have passed by offsetting background noise. In order to discriminate background noise from desired signals, an appropriate threshold in the processing device 14 may be provided for pixel values. Such calibration and threshold setting make the processing device 14 possible to acquire an accurate color count by the sensor 44.

Light reflected in various directions by the surface properties/minute shape of the object S is generally called scattered light. As described above, how much the distribution of scattered light spreads can be expressed by a BRDF. The BRDF spreads with an increase in color count which is acquired by the processing device 14 and narrows with a decrease in color count which is acquired by the processing device 14. That is, it is possible to identify differences in BRDF at the respective object points if the processing apparatus 14 can acquire color counts by the color count estimation processing at the respective image points. This makes the processing apparatus 14 possible to capture images of light from the object S which has passed through the wavelength selection portion 26 including at least the two different wavelength selection regions 52 and 54 to acquire images, acquire color counts by performing color count estimation processing for estimating, from the image, the number of wavelength selection regions 52 and 54 through which the light has passed, and identify the direction distributions of scattered light from the surface of the object S based on the color count (S103). Since the BRDF has correlation with the properties/minute shape of the surface S, the optical inspection system 10 is possible to identify differences in properties/minute shape of the surface S at the object point O1 and object point O2 on the surface of the object S according to this embodiment. This makes the optical inspection system 10 possible to contactlessly identify the properties/minute shape of the surface S (the state of the surface S) without spectroscopically dividing illumination (S104).

The above color count estimation processing with the processing device 14 has an effect of being independent of the normal direction of the surface of the object S. This is because, first of all, the spread of a BRDF depend on the properties/minute shape of the surface of the object S but does not depend on the normal direction. In addition, an estimated color count depends on the spread of a BRDF but does not depend on the normal direction. That is, even if the surface of the object S is a curved surface or the like, the optical inspection system 10 according to this embodiment has an effect of being capable of inspecting and identifying the surface properties/minute shape of the object S.

In addition, if the surface of the object S is a curved surface or the like, the optical inspection system 10 according to this embodiment has an effect of being capable of simultaneously acquiring the object points O1 and O2 having two different normal directions and images near the object points. This is because, the first illumination light L1 and the second illumination light L2 differ in illumination direction. If the first illumination light L1 and the second illumination light L2 have the same direction, the optical inspection system 10 is not possible to simultaneously acquire the first object point O1 and the second object point O2 and neighborhoods of the object points as images. That is, either first object point O1 or second object point O2 cannot be depicted bright and becomes dark.

In this embodiment, the color count acquired by the processing device 14 at the first image point I1 is one, and the color count acquired by the processing device 14 at the second image point I2 is two. This makes the processing device 14 possible to identify different BRDFs appearing at the first object point O1 on the surface of the object S and the second object point O2. That is, the processing apparatus 14 is possible to identify differences in properties/minute shape of the surface S between the object points O1 and O2.

As described above, according to this embodiment, there can be provided the optical inspection apparatus 12, the optical inspection system 10, the optical inspection method, and a non-transitory storage medium storing an optical inspection program, which can acquire information of the surface of the object S including a curved surface.

(First Modification)

Figure 4:
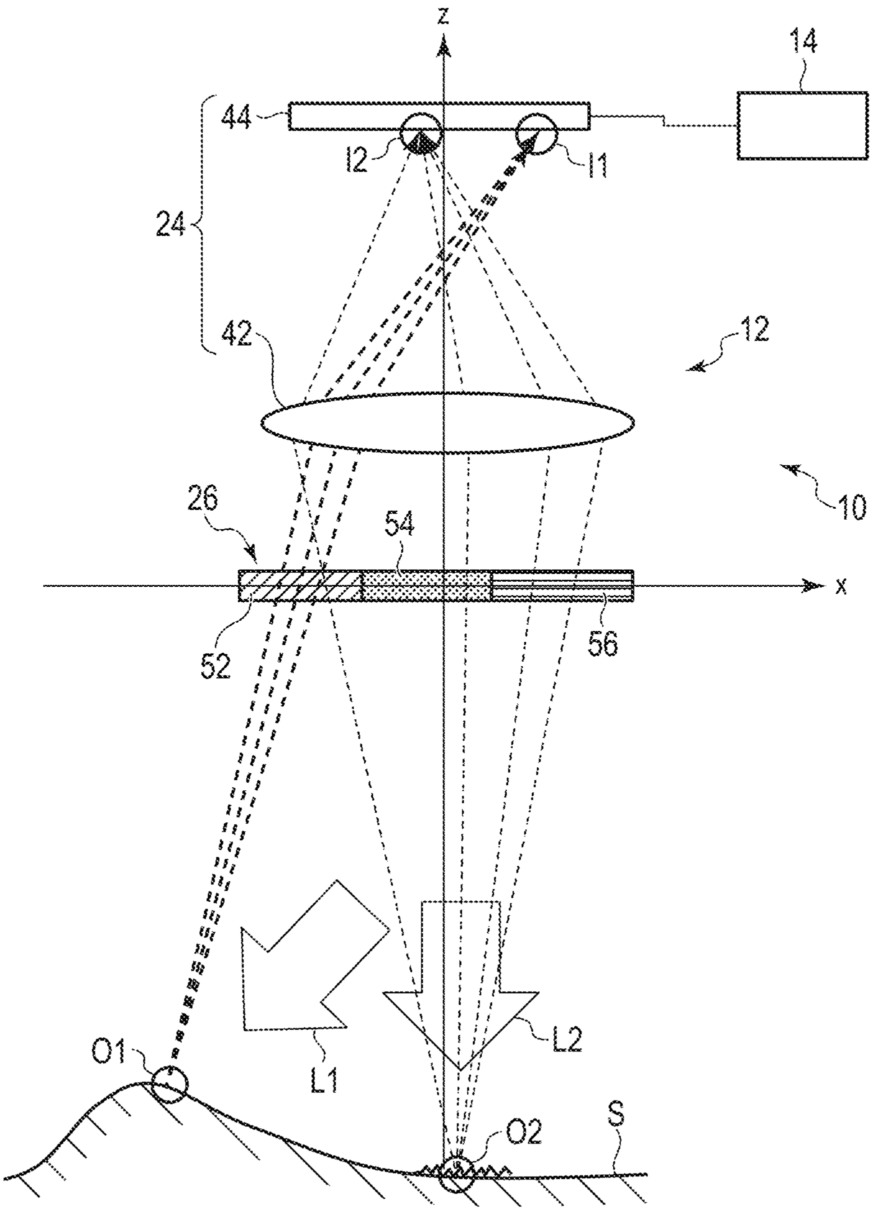
FIG. 4 is a schematic diagram showing an optical inspection system according to a first modification of the first embodiment.

FIG. 4 shows a modification of the optical inspection system 10 according to the first embodiment. In the optical inspection apparatus 12 shown in FIG. 4, an illustration of the illumination portion 22 will be omitted.

As shown in FIG. 4, the wavelength selection portion 26 of the optical inspection apparatus 12 includes a third wavelength selection region 56 in addition to the first wavelength selection region 52 and the second wavelength selection region 54. At this time, reflected light from the second object point O2 passes through the third wavelength selection region 56 of the wavelength selection portion and becomes, for example, green light having a spectrum from a wavelength of 520 nm to a wavelength of 580 nm. The green light is transferred from the second object point O2 to the second image point. This makes the color count at the second image point become three by color count estimation processing of the processing apparatus 14. On the other hand, the color count at the first object point O1 is one. Accordingly, there is a distinctive difference in color count between the first object point O1 and the second object point O2 by the processing apparatus 14, and hence the optical inspection system 10 can implement accurate optical inspection. In addition, there is an effect of grasping a BRDF distribution at the second object point O2 in more detail. That is, the optical inspection system 10 is possible to identify a difference in BRDF in the case of a color count of 2 and in the case of a color count of 3.

Therefore, according to this modification, there can be provided the optical inspection apparatus 12, the optical inspection system 10, the optical inspection method, and a non transitory storage medium storing an optical inspection program, which can acquire information of the surface of the object S including a curved surface.

(Second Modification)

Figure 5:
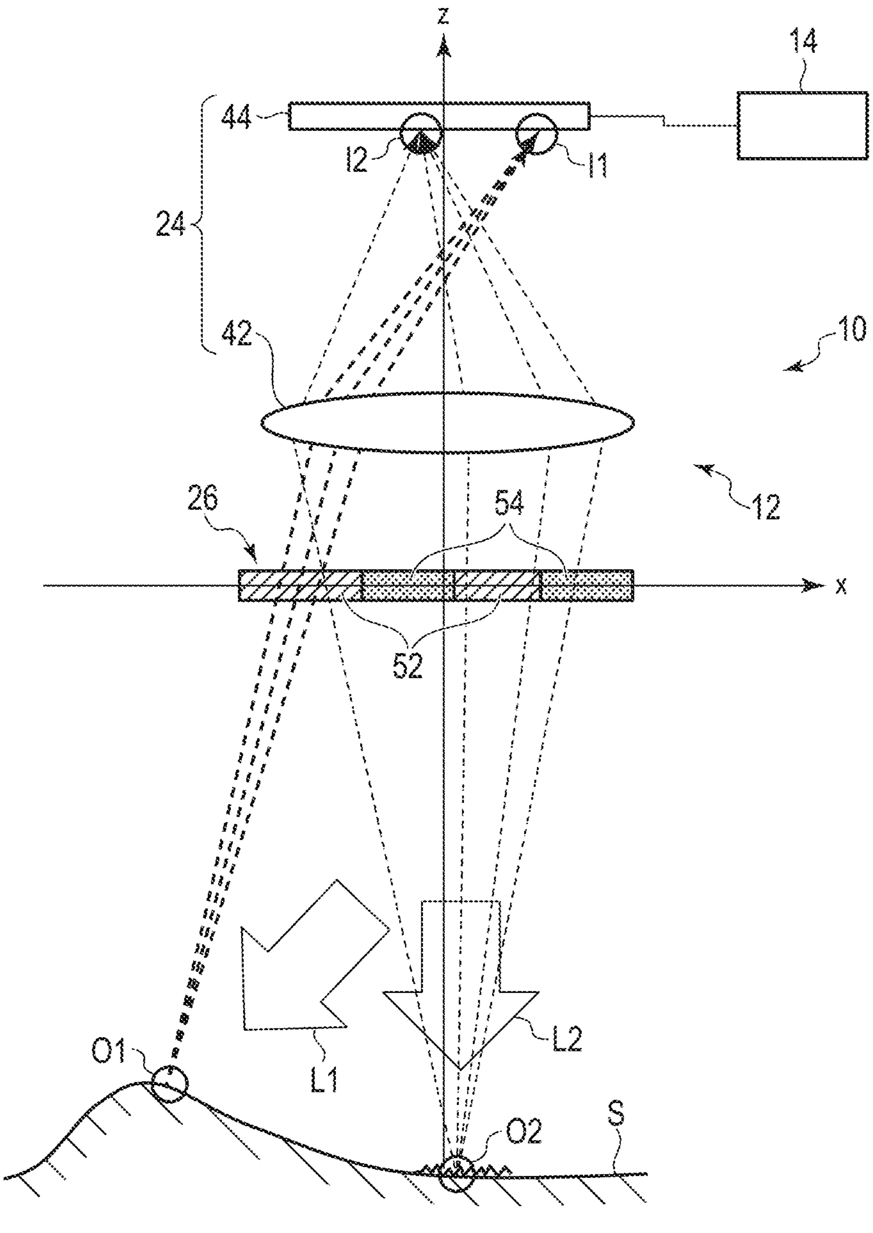
FIG. 5 is a schematic diagram showing an optical inspection system according to a second modification of the first embodiment.

FIG. 5 shows a modification of the optical inspection system 10 according to the first embodiment. In the optical inspection apparatus 12 shown in FIG. 5, an illustration of the illumination portion 22 will be omitted.

As shown in FIG. 5, wavelength selection regions identical to the wavelength selection regions of the wavelength selection portion 26 can be repeatedly used. The wavelength selection portion 26 has at least two other wavelength selection regions 52 and 54 having the same wavelength spectrum characteristics as those of at least the two wavelength selection regions 52 and 54. For example, the first wavelength selection region 52, the second wavelength selection region 54, the first wavelength selection region 52, and the second wavelength selection region 54 are arranged along the x-axis in the order named. The respective wavelength selection regions 52 and 54 extend parallel to the y-axis. Accordingly, the wavelength selection portion 26 has sets of wavelength selection regions 52 and 54 arranged in twos in the x-axis direction.

Even with this configuration, the color count acquired by the processing device 14 at the first image point I1 is one, and the color count acquired by the processing device 14 at the second image point I2 is two, thus making the color counts different. Accordingly, the optical inspection system 10 is possible to identify the difference in BRDF between the first object point O1 and the second object point O2. In addition, repeatedly using a set of the wavelength selection regions 52 and 54 of the same type while reducing the region widths, the optical inspection system 10 can produce an effect of improving the optical inspection accuracy for the object. That is, by reducing the widths of the wavelength selection regions 52 and 54 of the wavelength selection portion 26, the wavelength selection portion 26 can improve the sensitivity to the spread of a BRDF. This is because reducing the region widths of the wavelength selection portion 26 makes the color count changes with a smaller spread of the BRDF. As described above, by repeatedly arranging the wavelength selection regions 52 and 54, the optical inspection system 10 can improve the optical inspection accuracy for the object.

If the wavelength selection regions 52 and 54 in the optical inspection apparatus 12 are repeatedly arranged, the two wavelength selection regions 52 and 54 adjacent to the wavelength selection regions 52 and 54 need to be different from each other. That is, making the adjacent two wavelength selection regions 52 and 54 differ in transmission wavelength/shielding wavelength makes the optical inspection system 10 possible to identify the spread of a BRDF based on the color count.

Referring to FIG. 5, the two wavelength selection regions 52 and 54 in the optical inspection apparatus 12 have been described as one set, the three wavelength selection regions 52, 54, and 56 may be repeatedly arranged, with the three wavelength selection regions 52, 54, and 56 constituting one set.

Therefore, according to this modification, there can be provided the optical inspection apparatus 12, the optical inspection system 10, the optical inspection method, and a non transitory storage medium storing an optical inspection program, which can acquire information of the surface of the object S including a curved surface.

Second Embodiment

An optical inspection system 10 according to the second embodiment will be described with reference to FIG. 6.

Figure 6:
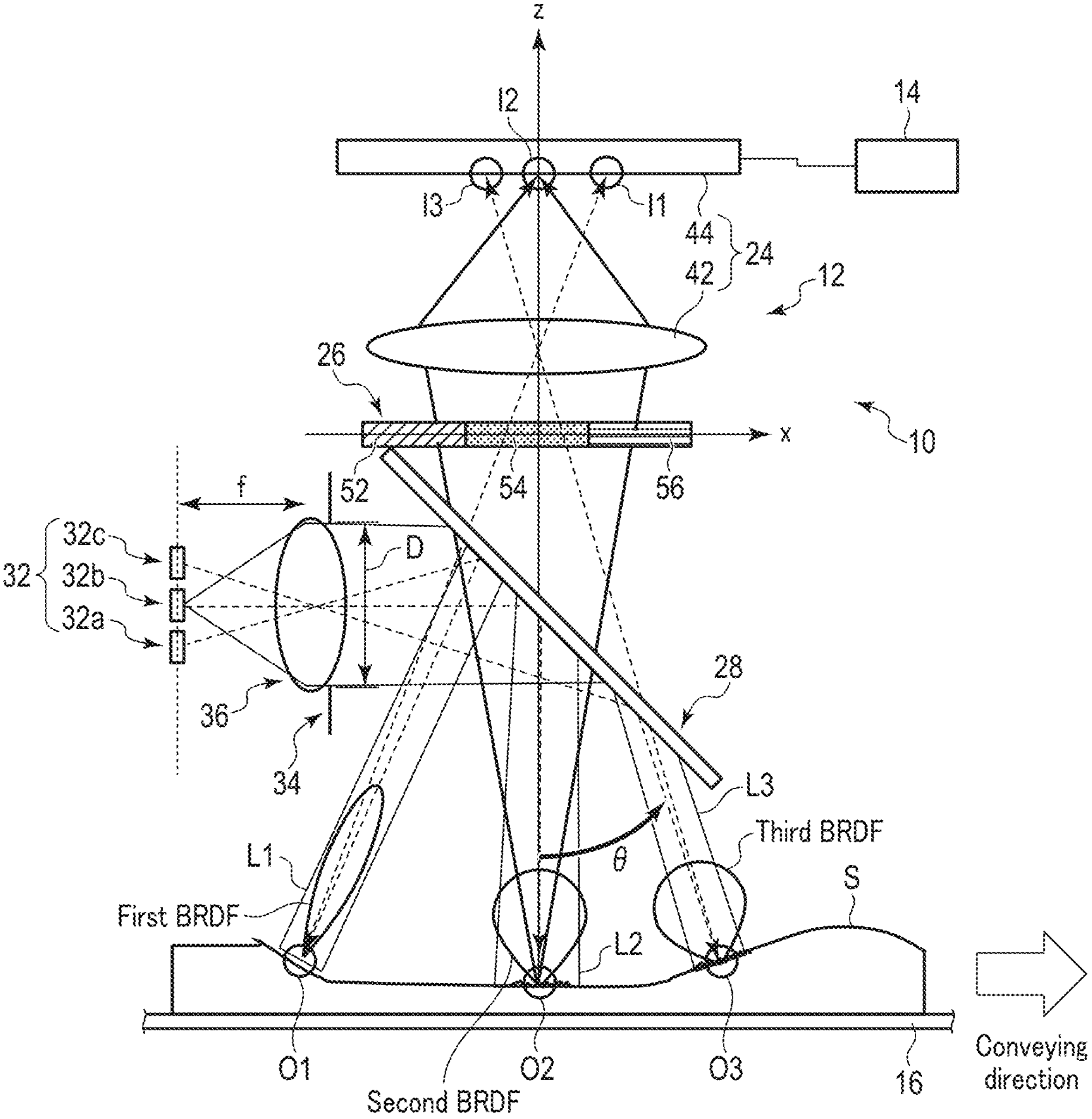
FIG. 6 is a schematic diagram showing an optical inspection system according to a second embodiment.

FIG. 6 is a sectional view of an optical inspection apparatus 12 according to this embodiment. This sectional view is on an x-z plane.

The basic configuration of the optical inspection apparatus 12 according to this embodiment is similar to that of the optical inspection apparatus 12 according to the first embodiment including each modification. The optical inspection apparatus 12 according to this embodiment further includes a beam splitter 28. An illumination portion 22 includes a plurality of (three in this case) light sources 32*a*, 32*b*, and 32*c*, an aperture 34, and a lens 36.

The optical inspection system 10 according to this embodiment further includes a conveying device 16, that conveys an object S, in addition to the optical inspection apparatus 12 and the processing device 14. The object S is conveyed in the conveying direction indicated by the arrow in FIG. 6 with the conveying device 16. In this case, the conveying direction of the object S is the x direction. As the conveying device 16, it is possible to use various devices such as a belt conveyor, a roller conveyor, and a linear stage. However, any of such devices can be used. Note, however, that, for example, a processing device 14 needs to control the conveying speed of the conveying device 16. In this case, for the sake of simplicity, the conveying speed of the object S is constant. In general, products in various manufacturing processes are often conveyed in this manner.

A wavelength selection portion 26 includes a first wavelength selection region 52, a second wavelength selection region 54, and a third wavelength selection region 56 arranged in the order named in the x direction. Assume that the wavelength selection regions 52, 54, and 56 are uniform in the depth direction (y direction) and have a stripe pattern. In this cross-section, the plurality of wavelength selection regions 52, 54, and 56 are arranged and do not change in the depth direction orthogonal to the cross-section.

In this embodiment, the wavelength selection portion 26 is anisotropic with respect to the optical axis of the imaging optical element 42. That is, the wavelength selection regions 52, 54, and 56 are not formed of a concentric pattern in which they change only in the moving radius direction from the optical axis.

The three light sources 32*a*, 32*b*, and 32*c* each are formed from, for example, an LED that emits while light. The LED may be formed by, for example, arraying a plurality of 3.3 mm×3.3 mm surface emission type LEDs. The three light sources (surface emission light sources) 32*a*, 32*b*, and 32*c* are arranged on, for example, the focal plane of the cylindrical lens 36 which is uniform in one direction. The three light sources 32*a*, 32*b*, and 32*c* are ON/OFF-controlled for light emission by the processing device 14. Note that three light sources 32*a*, 32*b*, and 32*c* emit light at the same timing.

The illumination portion 22 of the optical inspection apparatus 12 is configured to emit first illumination L1, second illumination light L2, and third illumination light L3 at the same timing and irradiates the surface of the object S with the illumination lights L1, L2 and L3 along the optical axis of an imaging optical element 42 via the beam splitter 28. Such an illumination method is called coaxial lighting.

The aperture 34 is arranged near the exit of the illumination portion 22 from which illumination light is emitted. Assume that the aperture 34 has a slit shape (stripe shape) and that, for example, the depth direction is the longitudinal direction, the size is 200 mm, and a slit width D in the transverse direction orthogonal to the longitudinal direction (the z direction in this embodiment) is 20 mm. The sectional view shown in FIG. 6 indicates the transverse direction.

Assume that the illumination lens 36 is, for example, a cylindrical lens and that the size in the longitudinal direction is 200 mm, and a focal length f is, for example, 20 mm. Note, however, that the illumination lens 36 is not limited to this and may be anything such as a free-form surface lens, Fresnel lens, or convex mirror.

With the above configuration, in this cross-section, illumination light from each of the first to third light sources 32*a*, 32*b*, and 32*c* becomes parallel light. Note, however, that the divergence full angle is the value obtained by dividing 3.3 mm, which is the emission size of the LED, by 20 mm, which is the focal length f, in this cross-section. That is, the divergence full angle is about 10°. At this time, the divergence angle is half of the divergence full angle, that is, 5°. Illumination light having such a divergence angle is substantially regarded as parallel light.

The operation of the optical inspection system 10 according to this embodiment will be described below.

When the first light source 32*a* is turned on, the first illumination L1 is generated. When the second light source 32*b* is turned on, the second illumination light L2 is generated. When the third light source 32*c* is turned on, the third illumination light L3 is generated. The illumination light L1, the illumination light L2, and the illumination light L3 can be emitted at the same timing by the optical inspection system 10. Note, however, the illumination light L1, the illumination light L2, and the illumination light L3 may be sequentially emitted in the chronological order by the optical inspection system 10. Sequentially emitting the illumination light L1, the illumination light L2, and the illumination light L3 and performing imaging for each emission with the image sensor 44 will produce an effect of clarifying a specific region from which a given image is acquired with a specific one of the illumination light L1, the illumination light L2, and the illumination light L3 by the optical inspection system 10. Assume that in this case, the first light source 32*a*, the second light source 32*b*, and the third light source 32*c* are turned on at the same timing by the optical inspection system 10.

The first illumination light L1, the second illumination light L2, and the third illumination light L3 each are parallel light having a divergence angle of about 5°. Assume that the angle formed between the principal ray of each parallel light and the optical axis of the imaging portion 24 is an illumination angle θ. Assume that the counterclockwise angle of the illumination angle θ in this cross-section is positive. Assume that the illumination angles θ of the first illumination L1, the second illumination light L2, and the third illumination light L3 are respectively −5°, 0°, and 5°.

In the cross-section shown in FIG. 6, the width of the irradiation field of each of the first illumination L1, the second illumination light L2, and the third illumination light L3 on the surface of the object S can be adjusted with a slid width D of the aperture 34 of the illumination portion 22. A width W of the irradiation field becomes larger than at least the slid width D. In this case, the width W of the irradiation field becomes at least 20 mm.

Assume that the surface of the object S conveyed by the conveying device 16 is a curved surface. The normal direction differs at first object point O1, a second object point O2, and a third object point O3. The first object point O1 is a mirror surface, and a minute defect exists at the second object point O2. A minute defect also exists at the third object point O3.

When the first object point O1 is irradiated with the first illumination L1, the spread of the direction distribution of light from the first object point O1 is narrow and can be expressed by the first BRDF. Light having the direction distribution of the first BRDF passes through only the second wavelength selection region 54 of the wavelength selection portion 26 and is formed into an image at a first image point I1 through the imaging optical element 42 of an imaging portion 24.

When the second object point O2 is irradiated with the second illumination L2, the spread of the direction distribution of light from the second object point O2 is relatively wide and can be expressed by the second BRDF. Light having the direction distribution of the second BRDF passes through all the first wavelength selection region 52, the second wavelength selection region 54, and the third wavelength selection region 56 of the wavelength selection portion 26 and is formed into an image at a second image point I2 through the imaging optical element 42 of the imaging portion 24.

When the third object point O3 is irradiated with the third illumination L3, the spread of the direction distribution of light from the third object point O3 is relatively wide and can be expressed by the third BRDF. Light having the direction distribution of the third BRDF passes through all the first wavelength selection region 52, the second wavelength selection region 54, and the third wavelength selection region 56 of the wavelength selection portion 26 and is formed into an image at a third image point I3 through the imaging optical element 42 of the imaging portion 24.

An image of light at each of the image points I1, I2, and I3 formed by the imaging portion 24 is received by an arbitrary pixel of the image sensor 44. Thus, the processing device 14 acquires images at the object points O1, O2, and O3.

As described above, even if the surface of the object S is a curved surface or the like, the number of the wavelength selection regions 52, 54, and 56 through which light passes changes depending on the BRDF of the surface of the object S. That is, there is an effect of being capable of identifying the BRDF on the curved surface based on the color count acquired by the processing device 14. By identifying the BRDF, the optical inspection system 10 will produce an effect of being capable of identifying the surface properties/minute shape of the object S.

Referring to FIG. 6, all the first object point O1, the second object point O2, and the third object point O3 are captured as images by an image sensor 44 of the imaging portion 24. Images of all the object points O1, O2, and O3 can be captured in this manner because the first illumination L1, the second illumination light L2, and the third illumination light L3 are directed in different directions, and light from the object points O1, O2, and O3 reaches the imaging portion 24 even if the surface of the object S is a curved surface or the like. If all the first illumination L1, the second illumination light L2, and the third illumination light L3 are directed in the same direction, an image of one of the object points is not depicted. That is, light from one of the object points does not reach the imaging portion 24, and a pixel at the corresponding image point becomes dark.

The imaging portion 24 exposes the image sensor 44 to light using an electric shutter controlled by the processing device 14, thereby acquiring an image. Note, however, that exposure by shutter control need not be electrically controlled and may be mechanically controlled.

Figure 7:
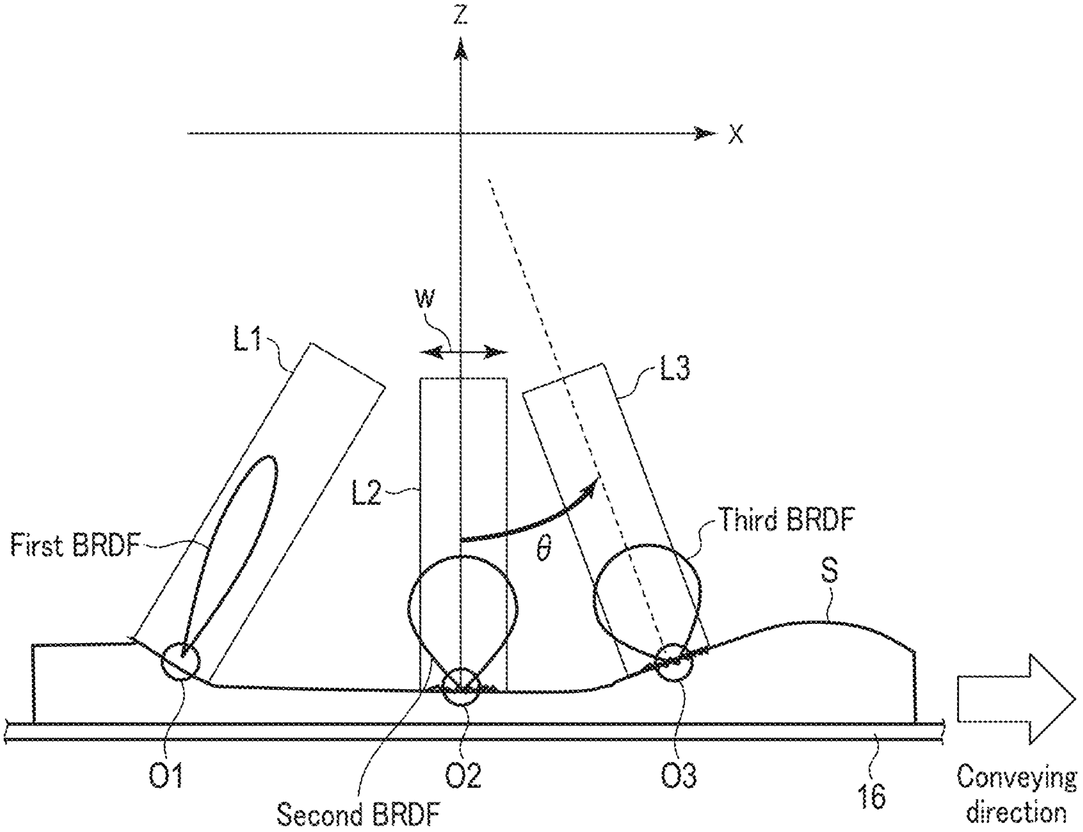
FIG. 7 is a schematic diagram showing the relationship between a sectional view of an object conveyed in a conveying direction at a given time, illumination light, and BRDF in the optical inspection system shown in FIG. 6.

FIG. 7 shows a cross-section of the object S conveyed in the conveying direction at the instant (first time) when the image sensor 44 is exposed to light by using the shutter. Referring to FIG. 7, an illustration of the optical inspection apparatus 12 is omitted.

Referring to the sectional view shown in FIG. 7, the widths of the irradiation fields of the illumination light L1, L2, and L3 in the x direction may differ among the first illumination L1, the second illumination light L2, and the third illumination light L3. The minimum width of the widths of these irradiation fields in the x direction is defined as a representative irradiation field width (illumination visual field width) W. In this case, the representative irradiation field width is 20 mm.

Assume that the shutter of the imaging portion 24 is released every time the conveyance distance along the conveying direction increases by the representative irradiation field width W. That is, every time an object is conveyed by 20 mm, the shutter is released to acquire an image by the processing device 14. That is, the imaging portion 24 performs imaging while conveying the object S in a predetermined conveying direction.

Figure 8:
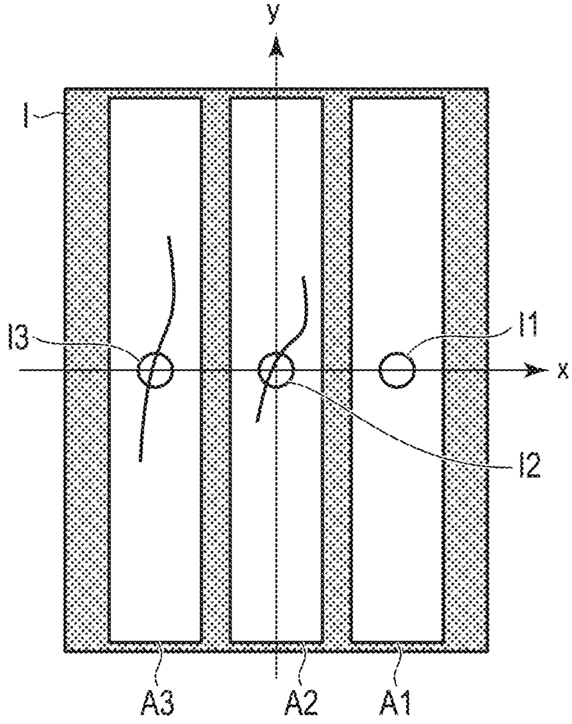
FIG. 8 is a schematic view of an image captured by an imaging portion at the time shown in FIG. 7.

FIG. 8 is a schematic view of an image I acquired by the imaging portion 24. In the image I, a first imaging region A1 is an image region exposed to the first illumination L1, a second imaging region A2 is an image region exposed to the second illumination light L2, and a third imaging region A3 is an image region exposed to the third illumination light L3.

In the first imaging region A1, since the normal direction at the first object point O1 and the direction of the first illumination L1 have an opposing relationship, reflected light from the first illumination L1 can reach the imaging portion 24. Accordingly, the first object point O1 is depicted in the image I. In contrast to this, if the relationship between the normal direction at the first object point O1 and the direction of the first illumination L1 greatly deviates from an opposing relationship, reflected light from the first illumination L1 cannot reach the imaging portion 24. Accordingly, the first object point O1 is not depicted in the image.

In this case, that the normal direction and illumination light have an opposing direction is that the normal direction is substantially opposite to the direction of the principal ray of the illumination light. Note, however, these directions need not be precisely opposite to each other and may be opposite to each other within the range of the divergence angle of the illumination light.

Likewise, since at each of the second object point O2 and the third object point O3, the normal direction at the object point and the direction of each of the second illumination light L2 and the third illumination light L3 have an opposing relationship, reflected light from the illumination light can reach the imaging portion 24. Accordingly, the second object point O2 and the third object point O3 each are depicted in the image I. In contrast to this, if the relationship between the normal direction at each of the second object point O2 and the third object point O3 and the direction of each of the second illumination light L2 and the third illumination light L3 greatly deviates from an opposing relationship, reflected light from the second illumination light L2 and reflected light from the third illumination light L3 each cannot reach the imaging portion 24. Accordingly, the second object point O2 and the third object point O3 each are not depicted in the image I.

Figure 9:
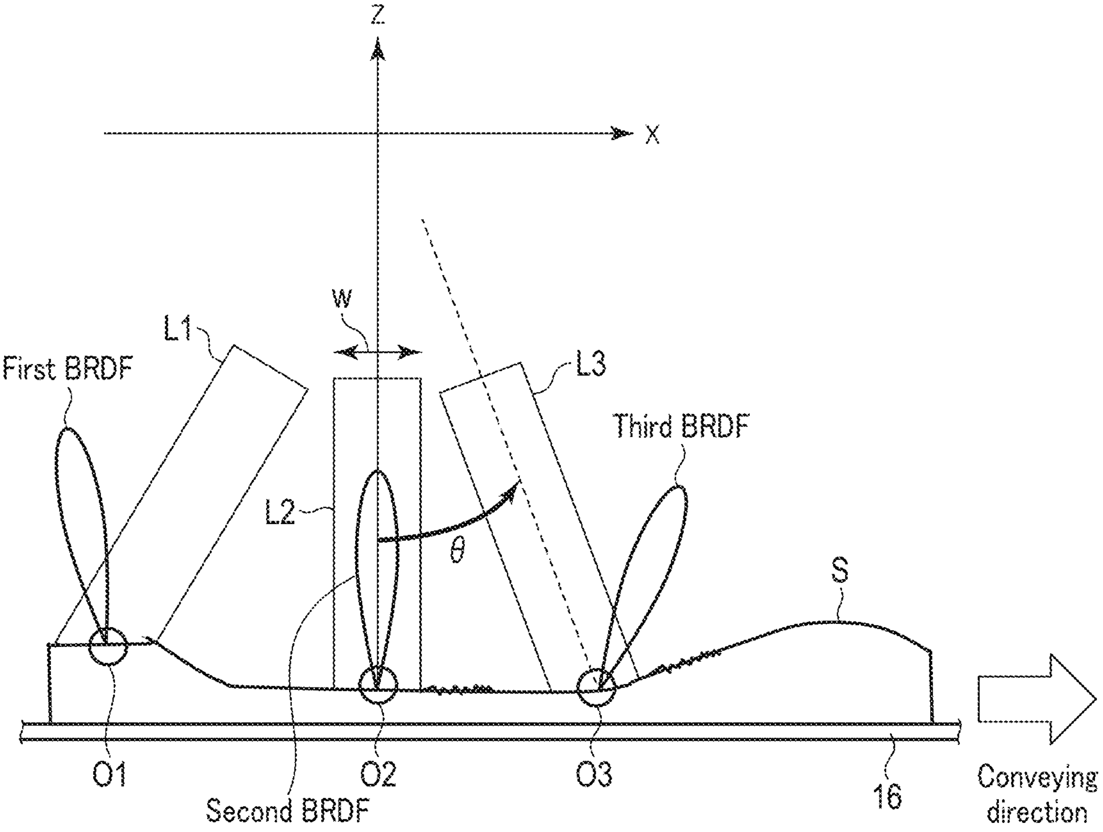
FIG. 9 is a schematic view showing the relationship between a sectional view of the object conveyed in the conveying direction at a time after the given time in FIG. 7, illumination light, and BRDF in the optical inspection system shown in FIG. 6.

FIG. 9 shows a state in which the conveying device 16 has conveyed the object S from the position of the object S shown in FIG. 7 by the representative irradiation field width W (for example, 20 mm) along the conveying direction.

Figure 10:
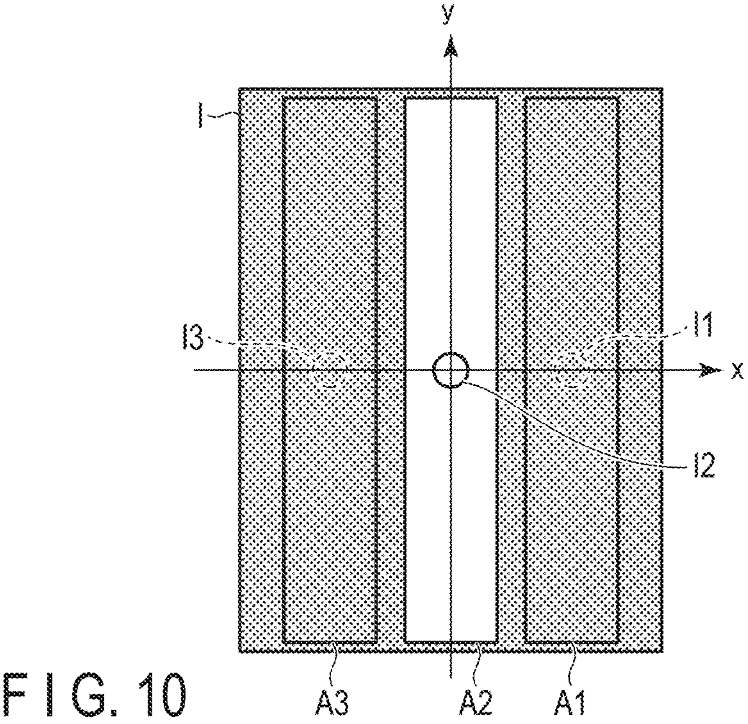
FIG. 10 is a schematic view showing an image captured by the imaging portion at the time shown in FIG. 9.

FIG. 9 shows a sectional view of the object S, and an illustration of the optical inspection apparatus 12 is omitted. FIG. 10 shows the image I acquired by the imaging portion 24.

In the first imaging region A1, since the relationship between the normal direction at the first object point O1 and the direction of the first illumination L1 greatly deviates from an opposing relationship, reflected light from the first illumination L1 cannot reach the imaging portion 24. Accordingly, the first object point O1 is not depicted in the image I.

In the second imaging region A2, since the normal direction at the second object point O2 and the direction of the second illumination light L2 have an opposing relationship, reflected light from the second illumination light L2 can reach the imaging portion 24. Accordingly, the second object point O2 is depicted in the image I.

In the third imaging region A3, since the relationship between the normal direction at the third object point O3 and the direction of the third illumination light L3 greatly deviates from an opposing relationship, reflected light from the third illumination light L3 cannot reach the imaging portion 24. Accordingly, the third object point O3 is not depicted in the image I.

As described above, in the optical inspection system 10, an image is captured every time the object moves by the representative irradiation field width W along the conveying direction, thereby acquiring a series of a plurality of images. With this operation, even if the surface of the object S is a curved surface, if the normal direction on the curved surface and the direction of illumination light have an opposing relationship, the optical inspection apparatus 12 can acquire the region as images. That is, an image of each region of the surface of the object S is captured in some portion of a series of acquired images. In contrast to this, if the surface of the object S is a flat surface, an image is always captured in the second imaging region. As described above, even if the surface of the object S is a flat surface or curved surface, the curved surface or the like can be imaged in the optical inspection apparatus 12.

Even if the surface of the object S is a flat surface or curved surface, the number of wavelength selection regions through which light passes changes in accordance with the BRDF of the surface of the object S. That is, the BRDF on the curved surface can be identified by a color count in the optical inspection system 10. Identifying the BRDF makes the optical inspection system 10 possible to identify the surface properties/minute shape of the object S.

Figure 11:
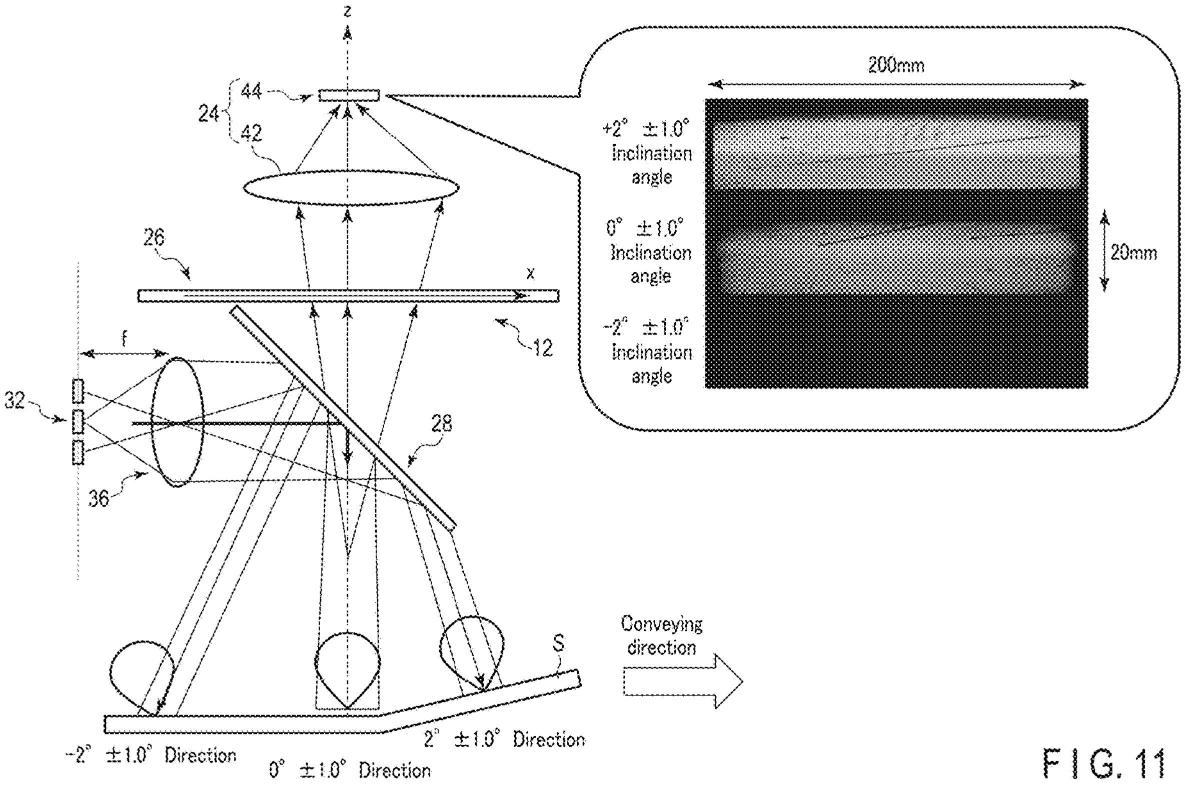
FIG. 11 is a view showing an example of an image including three object points and their neighborhoods of an object imaged by using the optical inspection system shown in FIG. 6.

Note that FIG. 11 shows an image including three object points and neighboring portions which are imaged by using the optical inspection system 10 having the optical inspection apparatus 12 shown in FIG. 6.

In the example shown in FIG. 11, since the normal direction (the inclination angle: −2°±1.0, where ± indicates the maximum runout width, beyond which no runout occurs) in the irradiation field of the first illumination L1 greatly deviates from an opposing relationship with respect to the first illumination L1, reflected light from the first illumination L1 cannot reach the imaging portion 24. Accordingly, the irradiation field of the first illumination L1 is not depicted in the lowermost portion of the image I in FIG. 11.

Since the normal direction (the inclination angle: 0°±1.0, where ± indicates the maximum runout width, beyond which no runout occurs) in the irradiation field of the second illumination L2 and the second illumination light L2 have an opposing relationship, reflected light from the second illumination light L2 can reach the imaging portion 24. Accordingly, the irradiation field of the second illumination light L2 is depicted in a central portion of the image I in FIG. 11 in the vertical direction.

Since the normal direction (the inclination angle: 2°±1.0, where ± indicates the maximum runout width, beyond which no runout occurs) in the irradiation field of the third illumination L3 and the third illumination light L3 have an opposing relationship, reflected light from the third illumination light L3 can reach the imaging portion 24. Accordingly, the irradiation field of the third illumination light L3 is depicted in the uppermost portion of the image I in FIG. 11.

As described above, while the object S is conveyed by the conveying device 16, the processing device 14 can acquire a color count by the color count estimation processing for an image depicted as the image I, and can identify the direction distribution of scattered light from the surface of the object S based on the color count (S103). Since the BRDF has correlation with the properties/minute shape of the surface S, the optical inspection system 10 is possible to identify differences in properties/minute shape of the surface S at the object points O1, O2, and O3 on the surface of the object S according to this embodiment. This makes the optical inspection system 10 possible to contactlessly identify the properties/minute shape of the surface S (the state of the surface S) without spectroscopically dividing illumination. (S104).

The optical inspection system 10 can obtain the surface properties and the like of the object S by exposing the image sensor 44 to light at predetermined time intervals using the shutter while conveying the object S in a predetermined conveying direction at a predetermined speed by the conveying device 16.

As described above, according to this embodiment, there can be provided the optical inspection apparatus 12, the optical inspection system 10, the optical inspection method, and a non-transitory storage medium storing an optical inspection program, which can acquire information of the surface of the object S including a curved surface and the like.

(Modification)

FIGS. 12 to 15 show examples of various wavelength selection portions 26.

Figure 12:
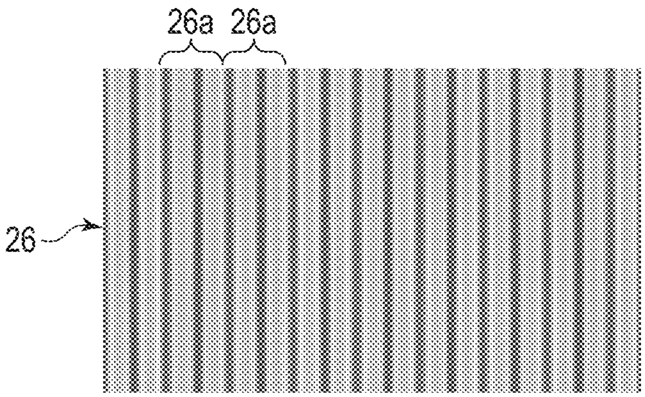
FIG. 12 is a view showing an example of a wavelength selection portion.

In the example of the wavelength selection portion 26 shown in FIG. 12, sets of red, green, and blue regions 26*a* formed to have, for example, an equal width are repeated in the x-axis direction. In the wavelength selection portion 26 shown in FIG. 12, the first wavelength selection region 52, the second wavelength selection region 54, and the third wavelength selection region 56 are formed to have stripe shapes and almost equal widths.

Figure 13:
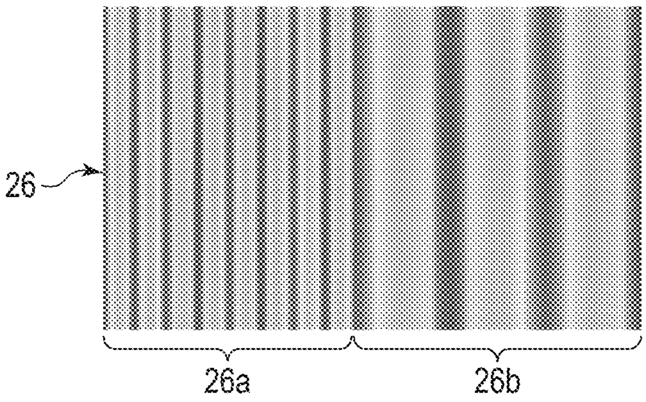
FIG. 13 is a view showing an example of a wavelength selection portion.

The example of the wavelength selection portion 26 shown in FIG. 13 is an example of a combination of a first region (wavelength selection portion) 26*a*, which is a set of red, green, and blue regions, each formed to have, for example, a first width, repeated in the x-axis direction, and a second region (wavelength selection portion) 26*b*, which is a set of red, green, and blue regions, each formed to have a width larger than the first width. The wavelength selection portion 26 shown in FIG. 13 includes the first region 26*a* and the second region 26*b*. The first region 26*a* and the second region 26*b* are arranged in the horizontal direction (x-axis direction) in FIG. 13. The first region 26*a* is formed like the wavelength selection portion 26 shown in FIG. 12. The second region 26*b* is formed such that a wavelength selection portion is formed wider in the horizontal direction than the wavelength selection portion 26 shown in FIG. 12 and the first region 26*a* in FIG. 13.

Figure 14:
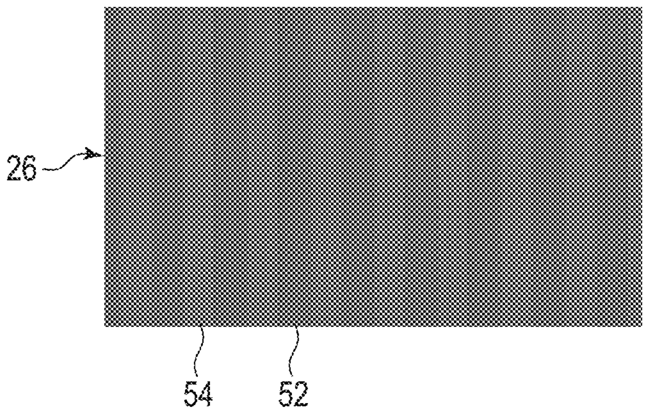
FIG. 14 is a view showing an example of a wavelength selection portion.

In the example of the wavelength selection portion 26 shown in FIG. 14, for example, a region (wavelength selection portion) 26*a* of a set of red and blue regions is repeated in the x-axis direction. Accordingly, each region 26*a* of the wavelength selection portion 26 includes a first wavelength selection region 52 and a second wavelength selection region 54. The region 26*a* of a set of the wavelength selection region 52 and the wavelength selection region 54 is repeated in the horizontal direction in FIG. 14. The wavelength selection regions 52 and 54 each have, for example, a constant width.

Figure 15:
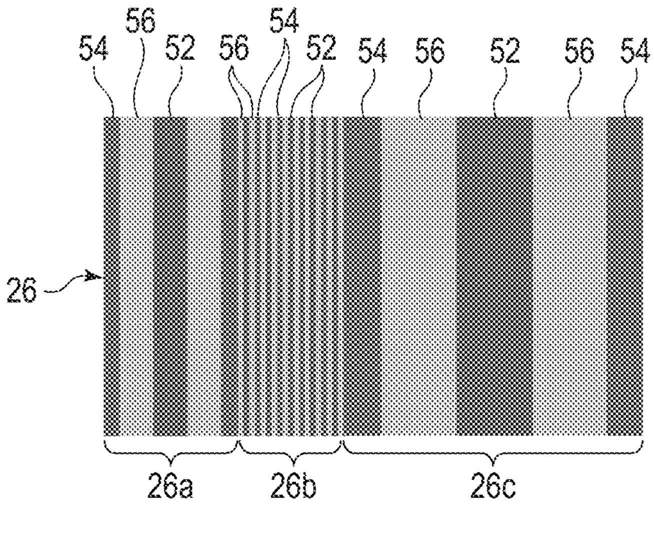
FIG. 15 is a view showing an example of a wavelength selection portion.

The wavelength selection portion 26 shown in FIG. 15 includes a first region 26*a*, a second region 26*b*, and a third region 26*c*. The first region 26*a*, the second region 26*b*, and the third region 26*c* are arranged in the horizontal direction in FIG. 15. The first region 26*a* has the wavelength selection regions 52, 54, and 56 each formed to have a width larger than that of the second region 26*b*. The second region 26*b* has the wavelength selection regions 52, 54, and 56 each formed to have width smaller than that of the third region 26*c*. The third region 26*c* has the wavelength selection regions 52, 54, and 56 each formed to have a width larger than that of the second region 26*b*.

As described above, the wavelength selection portions 26 shown in FIGS. 12 to 15 each have at least other two wavelength selection portions having the same wavelength spectrum properties as those of at least two wavelength selection portions. The wavelength selection portion 26 formed in this manner can be used as the wavelength selection portion described in the first and second embodiments. In addition, the wavelength selection portion 26 formed in this manner can be used as a wavelength selection portion described in the third embodiment.

Third Embodiment

An optical inspection system 10 according to the third embodiment will be described below with reference to FIG. 16.

Figure 16:
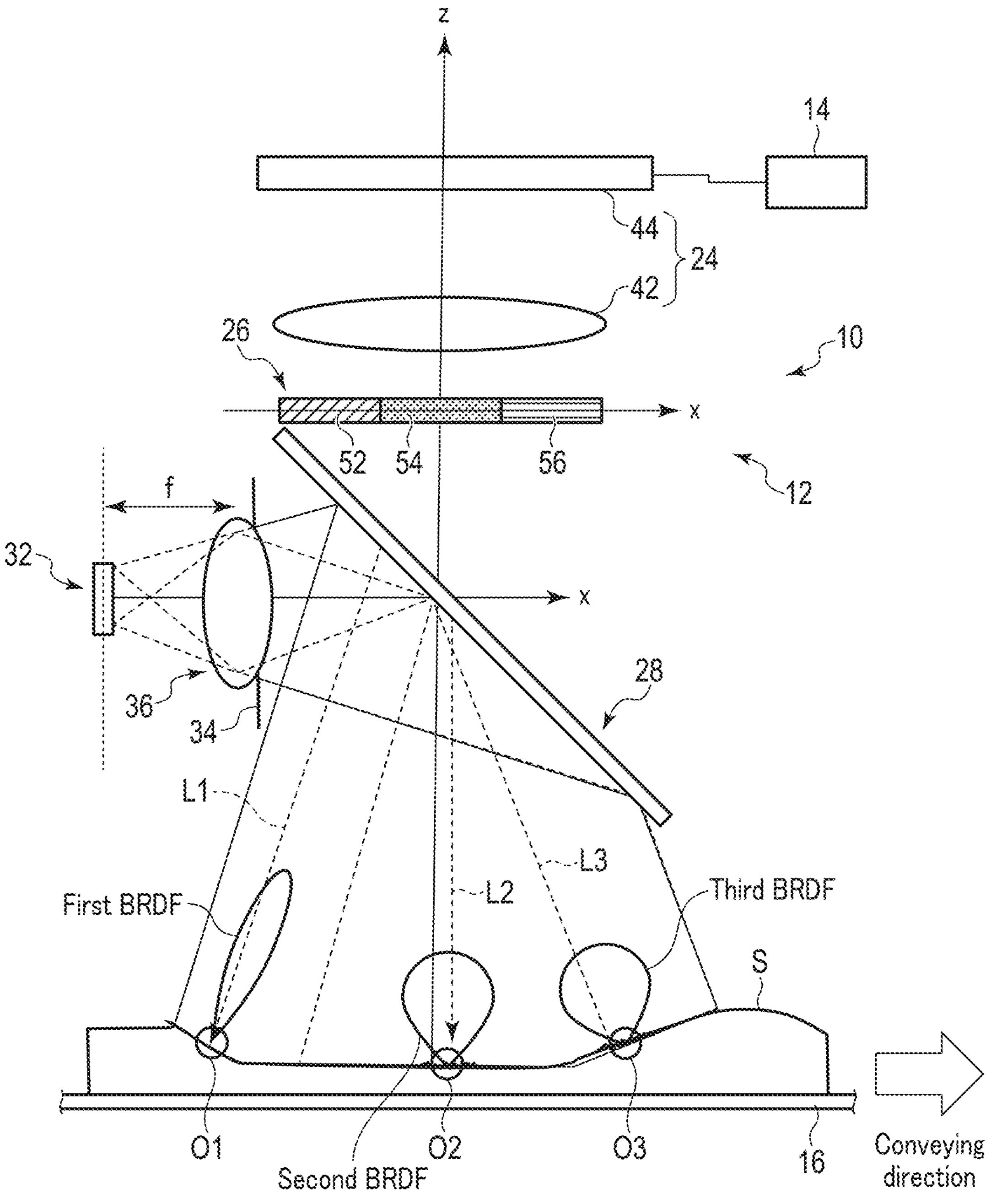
FIG. 16 is a schematic view showing an optical inspection system according to a third embodiment.

FIG. 16 shows a sectional view of an optical inspection apparatus 12, a processing device 14, and a conveying device 16 according to this embodiment.

An LED of a surface emission light source is used as a light source 32 of an illumination portion 22 shown FIG. 16. The light source 32 may be arranged on the focal plane of an illumination lens 36 to form a fan light beam. That is, illumination light emitted from the illumination portion 22 according to this embodiment may be a group of light beams including first illumination L1 and second illumination light L2 described in the first embodiment and the like, which are different parallel light beams in two directions. The illumination light formed by the entire light beam group may be illumination light that gradually spreads with a distance from the light source 32. In the sectional view shown in FIG. 16, the size of the light emitting surface of the light source 32 is 10 mm. Assume that the illumination lens 36 is a Fresnel lens and that the size in the longitudinal direction is 600 mm, and a focal length f is, for example, 10 mm. At this time, the divergence full angle of illumination light as the entire light beam group is, for example, about 53°.

In this embodiment, illumination light L can irradiate a first object point O1, a second object point O2, and a third object point O3 at the same timing. In addition, the optical inspection system 10 is possible to form a continuous irradiation field using the illumination light L on the surface of an object S. Unlike the image I shown in FIGS. 8 to 10, the entire pixels of an image sensor 44 of an imaging portion 24 can be effectively used.

Accordingly, according to this embodiment, there can be provided the optical inspection apparatus 12, the optical inspection system 10, the optical inspection method, and a non-transitory storage medium storing an optical inspection program, which can acquire information of the surface of the object S including a curved surface and the like.

According to at least one of the embodiments described above, there can be provided the optical inspection apparatus 12, the optical inspection system 10, the optical inspection method, and a non-transitory storage medium storing an optical inspection program, which can acquire information of the surface of the object S including a curved surface and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical inspection apparatus comprising:

an illumination portion including a light source, the illumination portion being configured to:

irradiate a first object point of a surface of an object with first illumination light from the light source, and irradiate a second object point of the surface of the object, which is different from the first object point, with second illumination light from the light source, the second illumination light having a direction different from a direction of the first illumination light;

a wavelength selection portion including at least two wavelength selection regions that selectively transmit light having different wavelength spectra; and an imaging portion including an imaging optical element and an image sensor which is arranged at an image plane of the imaging optical element, the image sensor being configured to:

image light from the first object point through the wavelength selection portion and through the imaging optical element in order, when a normal direction at the first object point and the direction of the first illumination light have an opposing relationship, and image light from the second object point through the wavelength selection portion and through the imaging optical element in order, when a normal direction at the second object point, which is different from the normal direction at the first object point, and the direction of the second illumination light have an opposing relationship, wherein the first illumination light and the second illumination light are part of a group of illuminations comprising a plurality of beams of parallel light traveling in a plurality of directions, such that the plurality of beams spread out in a fan shape while the plurality of beams approach the surface of the object and each beam maintains a state of the parallel light, the wavelength selection portion is arranged between the imaging optical element of the imaging portion and the surface of the object, and the wavelength selection portion and the imaging portion are disposed in a direction opposite to the direction of the first illumination light, and in a direction opposite to the direction of the second illumination light.

2. The apparatus according to claim 1, wherein:

the imaging optical element has an optical axis, and the wavelength selection portion is anisotropic with respect to the optical axis.

3. The apparatus according to claim 1, wherein the wavelength selection portion includes at least two other wavelength selection regions having the same wavelength spectrum characteristic as the at least two wavelength selection regions.

4. The apparatus according to claim 1, wherein the illumination portion includes a lens uniform in one direction, and the light source includes a surface emission light source provided on a focal plane of the lens.

5. An optical inspection system comprising:

the optical inspection apparatus according to claim 1; and a processing apparatus including a processor, the processing apparatus being connected to the optical inspection apparatus, wherein the processor is configured to acquire a color count received by color channels of pixels of the image sensor of the imaging portion and inspect a state of the surface of the object based on the color count.

6. An optical inspection system comprising:

the optical inspection apparatus according to claim 1; and a conveying device including a conveyor configured to convey the object, wherein the image sensor is configured to image Bidirectional Reflectance Distribution Functions (BRDFs) at at least two different incident angles to the object.

7. The system according to claim 6, wherein:

the illumination portion includes an aperture near an exit through which the illumination light from the illumination portion exits, and the image sensor of the imaging portion is configured to image the surface of the object while the conveying device conveys the object for each illumination visual field width determined by a width of the aperture.

8. The apparatus according to claim 1, wherein:

the plurality of beams are separate from each other when they reach the surface of the object.

9. The apparatus according to claim 1, wherein:

the plurality of beams form a continuous irradiation field on the surface of the object.

10. An optical inspection method comprising:

irradiating, by an illumination portion, a first object point of a surface of an object with first illumination light from a light source, wherein a wavelength selection portion, an imaging optical element, and an image sensor are disposed in a direction opposite to a direction of the first illumination light;

irradiating, by the illumination portion, a second object point of the surface of the object, which is different from the first object point, with second illumination light from the light source, the second illumination light having a direction different from the direction of the first illumination light, wherein the wavelength selection portion, the imaging optical element, and the image sensor are disposed in a direction opposite to a direction of the second illumination light;

imaging, with the image sensor, light from the first object point through the wavelength selection portion having at least two wavelength selection regions and through the imaging optical element in order, when a normal direction at the first object point and the direction of the first illumination light have an opposing relationship, the image sensor being arranged at an image plane of the imaging optical element; and imaging, with the image sensor, light from the second object point through the wavelength selection portion and through the imaging optical element in order at the same timing as imaging of the light from the first object point, when a normal direction at the second object point, which is different from the normal direction at the first object point, and the direction of the second illumination light have an opposing relationship, wherein the first illumination light and the second illumination light are part of a group of illuminations comprising a plurality of beams of parallel light traveling in a plurality of directions, such that the plurality of beams spread out in a fan shape while the plurality of beams approach the surface of the object and each beam maintains a state of the parallel light.

11. The method according to claim 10, wherein the imaging includes imaging the object while relatively conveying the object in a predetermined conveying direction, and the imaging includes imaging Bidirectional Reflectance Distribution Functions (BRDFs) at at least two different incident angles to the object.

12. The method according to claim 10, wherein:

the plurality of beams are separate from each other when they reach the surface of the object.

13. The method according to claim 10, wherein:

the plurality of beams form a continuous irradiation field on the surface of the object.

14. A non-transitory storage medium storing an optical inspection program for causing a processor to execute:

irradiating, by an illumination portion, a first object point of a surface of an object with first illumination light from a light source, wherein a wavelength selection portion, an imaging optical element, and an image sensor are disposed in a direction opposite to a direction of the first illumination light;

irradiating, by the illumination portion, a second object point of the surface of the object, which is different from the first object point, with second illumination light from the light source, the second illumination light having a direction different from the direction of the first illumination light, wherein the wavelength selection portion, the imaging optical element, and the image sensor are disposed in a direction opposite to a direction of the second illumination light;

imaging, with the image sensor, light from the first object point through the wavelength selection portion having at least two wavelength selection regions and through the imaging optical element in order, when a normal direction at the first object point and the direction of the first illumination light have an opposing relationship, the image sensor being arranged at an image plane of the imaging optical element; and imaging, with the image sensor, light from the second object point through the wavelength selection portion and through the imaging optical element in order at the same timing as imaging of the light from the first object point, when a normal direction at the second object point, which is different from the normal direction at the first object point, and the direction of the second illumination light have an opposing relationship, wherein the first illumination light and the second illumination light are part of a group of illuminations comprising a plurality of beams of parallel light traveling in a plurality of directions, such that the plurality of beams spread out in a fan shape while the plurality of beams approach the surface of the object and each beam maintains a state of the parallel light.

15. The non-transitory storage medium according to claim 14, wherein the imaging includes imaging the object while relatively conveying the object in a predetermined conveying direction, and the imaging includes imaging Bidirectional Reflectance Distribution Functions (BRDFs) at at least two different incident angles to the object.

16. The non-transitory storage medium according to claim 14, wherein:

the plurality of beams are separate from each other when they reach the surface of the object.

17. The non-transitory storage medium according to claim 14, wherein:

the plurality of beams form a continuous irradiation field on the surface of the object.

* * * * *